United States Patent
Krammer

(10) Patent No.: US 10,040,228 B2
(45) Date of Patent: Aug. 7, 2018

(54) DEVICE AND METHOD FOR PRODUCING A TUBE HEAD, AND TUBE HEAD

(71) Applicant: ALPLA WERKE ALWIN LEHNER GMBH & CO. KG, Hard (AT)

(72) Inventor: Christian Krammer, Campinas (BR)

(73) Assignee: ALPLA WERKE ALWIN LEHNER GMBH & CO. KG (AT)

(*) Notice: Subject to any disclaimer, the term of this patent is extended or adjusted under 35 U.S.C. 154(b) by 0 days.

(21) Appl. No.: 14/429,686

(22) PCT Filed: Sep. 17, 2013

(86) PCT No.: PCT/EP2013/069192
§ 371 (c)(1),
(2) Date: Mar. 19, 2015

(87) PCT Pub. No.: WO2014/044647
PCT Pub. Date: Mar. 27, 2014

(65) Prior Publication Data
US 2015/0246468 A1    Sep. 3, 2015

(30) Foreign Application Priority Data

Sep. 19, 2012   (CH) .................................. 1696/12

(51) Int. Cl.
*B29C 45/00* (2006.01)
*B65D 65/02* (2006.01)
(Continued)

(52) U.S. Cl.
CPC ...... *B29C 45/0003* (2013.01); *B29C 45/1603* (2013.01); *B29C 45/2896* (2013.01);
(Continued)

(58) Field of Classification Search
CPC ............ B29C 45/0003; B29C 45/1603; B29C 45/2896; B65D 35/02
See application file for complete search history.

(56) References Cited

U.S. PATENT DOCUMENTS 2,777,164 A * 1/1957 Strahm .................. B29C 45/03
264/DIG. 41
4,530,654 A * 7/1985 Rose .................. B29C 45/2896
425/548
(Continued)

FOREIGN PATENT DOCUMENTS

DE    202010008758 U1    12/2010
EP        1033318 A1     9/2000
(Continued)

*Primary Examiner* — Alison L Hindenlang
*Assistant Examiner* — Emmanuel S Luk
(74) *Attorney, Agent, or Firm* — Morriss O'Bryant Compagni Cannon, PLLC

(57) ABSTRACT

An injection-molding device for producing at least one tube head having a tube shoulder and a neck formed thereon has a press-out opening comprising a mold that defines a mold cavity and a nozzle that interacts with the mold. The nozzle has a valve needle that can be moved in the nozzle body. The valve needle is surrounded by a first flow channel, through which a first material component can be pressed out. The opening of the nozzle is closed by the valve needle head in a retracted position of the valve needle and released by the valve needle head in an advanced position of the valve needle In the advanced position of the valve needle, an annular outlet opening is formed, which establishes a fluid connection into the mold cavity together with an annular gap of the mold serving as a gate.

21 Claims, 9 Drawing Sheets

(51) Int. Cl.
  *B29D 23/00* (2006.01)
  *B29C 45/16* (2006.01)
  *B29C 45/28* (2006.01)
  *B65D 35/02* (2006.01)
  *B29L 23/20* (2006.01)
  *B29C 45/27* (2006.01)
  *B29L 23/00* (2006.01)

(52) U.S. Cl.
  CPC ............ *B29D 23/001* (2013.01); *B65D 35/02* (2013.01); *B29C 45/1642* (2013.01); *B29C 2045/2714* (2013.01); *B29L 2023/20* (2013.01); *B29L 2023/22* (2013.01)

(56) References Cited

U.S. PATENT DOCUMENTS

| | | | | |
|---|---|---|---|---|
| 5,785,915 | A * | 7/1998 | Osuna-Diaz | B29C 45/27 264/328.9 |
| 6,099,780 | A * | 8/2000 | Gellert | B29C 45/1603 264/255 |
| 6,989,124 | B2 * | 1/2006 | Miller | B29C 45/44 264/318 |
| 7,527,490 | B2 * | 5/2009 | Fairy | B29C 45/1603 425/130 |
| 8,753,102 | B2 * | 6/2014 | Ten | B29C 45/1603 425/130 |
| 2002/0028266 | A1 | 3/2002 | Babin | |
| 2004/0109916 | A1 * | 6/2004 | Babin | B29C 45/1603 425/572 |
| 2006/0157502 | A1 | 7/2006 | Meausoone | |
| 2007/0082160 | A1 | 4/2007 | Dambricourt | |
| 2007/0222111 | A1 * | 9/2007 | Hussain | B29C 45/1603 264/255 |
| 2010/0092711 | A1 * | 4/2010 | Atance Orden | B29C 45/1625 428/36.91 |
| 2010/0193990 | A1 * | 8/2010 | Privan | B29C 45/0003 264/165 |
| 2011/0108505 | A1 * | 5/2011 | Toyoda | B29B 11/14 215/12.2 |
| 2011/0233824 | A1 | 9/2011 | Alaterre | |
| 2014/0054255 | A1 * | 2/2014 | Hosokoshiyama | B29C 45/1646 215/12.1 |
| 2014/0272283 | A1 * | 9/2014 | Swenson | B29C 45/231 428/137 |
| 2015/0079321 | A1 * | 3/2015 | Takeuchi | B29C 45/1603 428/35.7 |

FOREIGN PATENT DOCUMENTS

| | | |
|---|---|---|
| EP | 1698561 A1 | 9/2006 |
| JP | 5162174 A | 6/1993 |
| JP | 8300418 A | 11/1996 |
| JP | 9254192 A | 9/1997 |
| WO | 0023340 A1 | 4/2000 |

* cited by examiner

DEVICE AND METHOD FOR PRODUCING A TUBE HEAD, AND TUBE HEAD

CROSS-REFERENCE TO RELATED APPLICATIONS

This application is a national phase entry under 35 U.S.C. § of PCT/EP2013/069192 filed on Sep. 17, 2013, which claims priority to Swiss Patent Application 01696/12 filed on Sep. 19, 2012, the entirety of each of which is incorporated by this reference.

The invention relates to a device and method for producing a tube head, and to a tube head.

PRIOR ART

EP-A-1 033 318 discloses a method for producing a tube shoulder in which method a first material component is injected into a first cavity, this material component is removed from this first cavity on a carrier in the partially-plastic state and released such that when the carrier and the first material component are introduced into a second cavity, a free space is formed having at least one surface that, after the injection of a second material component, acts as a mechanical stop for the first material component relative to the second material component. This creates a positive fit between the first and second material components. The claimed method has the advantage that the material consumption for a two-layer tube is reduced and the cycle time in production is decreased. On the other hand, it is a drawback that two different cavities are needed for producing the tube shoulder and the tube shoulder must be transported from one cavity to the next cavity during production.

Known from WO 00/23340 is a tube head that has at least a 3-layer structure. A barrier layer is enclosed by an inner and an outer layer, including at the ends of the tube head, where the inner and outer layers are combined to form one layer. That is, the ends of the barrier layer are enclosed or encapsulated by the inner and outer layers. The tube head is produced by means of co-injection. A structure material A is fed into an injection nozzle during a time period $T_o$. Starting at a specific time during the feeding in of the structure material, a material flow made of barrier material is co-injected for a brief period. Once the barrier material flow has stopped, the structure material continues to be injected for a specific period in order to stabilize the quantity of injected structure material. Although the method described is characterized as a co-injection method, in fact the two materials are injected simultaneously only for a very brief period of time. It is a drawback of the method of WO 00/23340 that the tube head always requires further finishing. The gate pin that necessarily results through the central opening of the injection nozzle must be cut away and the opening edges must be machined.

US patent application no. 2011/0233824 relates to a method for producing rotationally symmetrical bodies in which the molten plastic is not injected into the cavity via a central injection point, but instead is injected via an annular opening. For carrying out the method, a device is used that has an outer mold that has a central channel. A closure pin is guided axially movable in the channel. The anterior end of the closure pin has an expanded, rotationally symmetrical head, the greatest circumference of which head cooperates with the inner wall of the channel to form a valve. An annular space is present between the closure pin and the inner wall of the channel, and during operation the molten plastic is pressed through this annular space. For producing a rotationally symmetrical body, the closure pin is moved out of the mold so that an annular outlet channel is formed between the channel and the closure pin. A core is provided for embodying the hollow space of the body, at the end face of which core a recess is provided. When the valve is open, the head engages in this recess.

US patent application describes a valve pin assembly for an injection molding apparatus comprising a valve pin capable of movement up and down in a nozzle to open and close a ring gate. An annular passage is created through the nozzle and is unobstructed and without restriction at all points up to and through the ring gate, permitting melt to flow freely to the gate and, depending on the position of the valve pin, into the mold cavity. The valve pin has a head with a diameter larger than the valve pin shaft for selectively closing the gate. The ring gate channel diameter is larger than the melt channel diameter to permit part with larger apertures therein to be formed.

Advantages

It is therefore an advantage of the present invention to provide an injection molding device and a method for producing a tube front part or tube head, with or without barrier layer, with which it is no longer necessary to machine the tube head. A further advantage is the provision of a tube head having a barrier layer in which the at least two layers are securely joined to one another. Yet another advantage is to reduce the cycle time for producing the tube head in order to increase productivity.

SUMMARY OF THE INVENTION

These and other advantages are achieved using the subject matter according to the claimed invention. Advantageous embodiments of the subject matter according to the invention and of the method are defined in the subordinate claims.

The invention relates to an injection molding device for producing at least one tube head having a tube shoulder and a neck formed thereon having a press-out opening. The device includes a mold that encloses a mold cavity corresponding to the tube head to be produced and includes a nozzle for injecting a plastic melt coming from an injection unit. The nozzle has a nozzle body, an optional valve sleeve, and a valve needle that are accommodated axially movable (in the longitudinal axis of the valve needle) in the nozzle body. The valve needle and the valve sleeve may be moved independently of one another. The valve needle is enclosed by a first annular space that acts as a first flow channel for a first material component. Provided at the anterior end of the nozzle is a nozzle opening that is closed by the valve needle head when the valve needle is in a retracted position and is released by the valve needle head when the valve needle is in an advanced position.

According to the invention, the advanced position of the valve needle forms an annular outlet opening that correlates to an annular gap of the mold that acts as a gate opening or a produces a fluid connection between the at least one flow channel and the mold cavity. The annular outlet opening has the advantage that the melt flow may penetrate radially outward and directly via the annular gap of the mold into the mold cavity. That is, in contrast to the previously cited prior art, the injection into the mold is not via a central, substantially point-like gate opening, but instead is via an annular gap that is located directly in the neck area of the tube.

Thus a gate pin and therefore machining of the tube head can be avoided.

A fluid connection between the mold cavity and the first flow channel is formed using the annular outlet opening and the annular gap provided in the mold when the valve needle is advanced, i.e. when the open valve is open.

The mold advantageously has a mold insert having an inner contour, which substantially defines the outer shape of the tube head, and having a core with an outer contour that reproduces the inner shape of the tube head. When the mold is in the production position, there is therefore a mold cavity between the mold insert and the core that corresponds to the tube head.

The end face of the core advantageously has a recess in the shape of a hollow cylinder, closed on one side, for receiving the valve needle head. The valve needle is also guided laterally in the open position by this. The mold insert is usefully made of multiple parts and in the neck area has two movable sliding parts that are movable in opposing directions between an open position and a closed position. The movable sliding parts permit production of a tube neck having a male thread.

The annular gap may be provided between the core and the mold insert. This is a simple and useful embodiment that permits direct production of a finished tube head. An axial cylindrical section of the mold insert, in cooperation with the needle head, may form a first valve. The valve needle head advantageously has a cylindrical body and a conical tip. The valve needle head may be reliably inserted into the end face recess of the core using the conical tip. The diameter of the valve needle head or of the cylindrical body is greater than the diameter of the valve needle shaft so that there is room for embodying a flow channel.

According to one embodiment, a movable valve sleeve that encloses the valve needle shaft is provided, wherein a second annular space is present between the valve needle shaft and the valve sleeve and acts as a second flow channel for a second material component. This embodiment has the advantage that two material components may be injected simultaneously when the valve needle and the valve sleeve are axially movable independently of one another. Usefully, the diameter of the valve needle head is greater than the diameter of the valve needle shaft so that the valve needle head may act as valve seat for the valve sleeve.

A conical transition area may be provided between the valve needle shaft and the valve needle head. The end face of the valve sleeve may cooperate in a sealing manner with the conical transition area for forming a second valve. The transition area in this case acts as valve seat for the movable valve sleeve.

According to a refinement, the conical transition area has a circumferential depression adjacent to the cylindrical body. The purpose of the depression is to divert the plastic melt so that the annular gap of the mold presents as little flow resistance as possible to the plastic melt.

The subject matter of the present invention is also a method for producing at least one tube head having a tube shoulder and a neck formed thereon having a press-out opening in an injection molding process. This method is characterized in that one or a plurality of material components are injected through an annular gap into the mold cavity.

The annular gap is usefully provided on the neck inner wall, or on the outer or outer-most neck edge, so that no gate pin or the like is left over after the injection molding.

For producing an at least two-layer tube head, a first material component and a second material component may be injected simultaneously. According to one embodiment, the second material component may be injected with a temporal delay. This has the advantage that the first material component may enclose the second component, at least on the end face.

According to one production variant, the second material component is not injected until the mold cavity is filled at least 50%, at least 65%, and or at least 75%, by the first material component. In this manner it is possible to realize a three-layer structure when the second component is injected into the core of the first component. In the specialized sector, "core" is understood to be the interior of a layer. In this case the layer interior is still flowable when the second component is being injected, so that the second component can spread in the interior of the first component.

At the end of an injection molding cycle, when the second material component has stopped for a certain period of time prior to the first material component, the second material component, normally a barrier substance, may be surrounded by the first component on the end face. The aforesaid period of time is advantageously between 0.01 and 0.5 s, between 0.05 and 0.3 s, or between 0.1 and 0.2 s. An injection molding device that has an annular outlet opening may be used for carrying out the method.

Another subject matter of the present invention is a tube head having a tube shoulder and a neck formed on the tube shoulder having a press-out opening produced according to the method as described in this document. The tube head produced using the method according to the invention has the advantage that a good bond of the two material components may be attained by simultaneously injecting the two material components during the entire duration of the work cycle. The outer material component during cooling usefully has greater shrinkage than the inner material component. This has the positive effect that the outer material component is semi-shrink-fitted onto the inner component. In experiments it was found that at least 5% greater shrinkage, at least 10% greater shrinkage, or at least 15% greater shrinkage of the outer structure component is sufficient to attain a good bond for the two layers. That is, if a second component has shrinkage of 5%, then the first component should have shrinkage of 5.25%.

One advantageous embodiment provides that the tube has at least two layers, specifically an outer layer made of a structure material and an inner layer made of a barrier material. Another advantageous embodiment provides that the tube has three layers, specifically an outer layer and an inner layer made of a structure material and an intermediate layer made of a barrier material. However, it is also possible for additional adhesion layers to be provided in order to improve the connection between the first and second materials. The structure material is usefully selected from one of the following material components: polyethylene (PE), polypropylene (PP), or HDPE. The barrier material is selected from one of the following material components: EVOH, polyamide, or polyimide. Advantageous material compositions are for instance polyethylene (PE) or HDPE for structure materials with polyamide (PA) as barrier material, and polypropylene (PP) as structure material with EVOH as barrier material.

BRIEF DESCRIPTION OF THE DRAWINGS

Exemplary embodiments of the invention shall now be described with reference to the drawings.

DETAILED DESCRIPTION OF THE INVENTION

Figure 1:
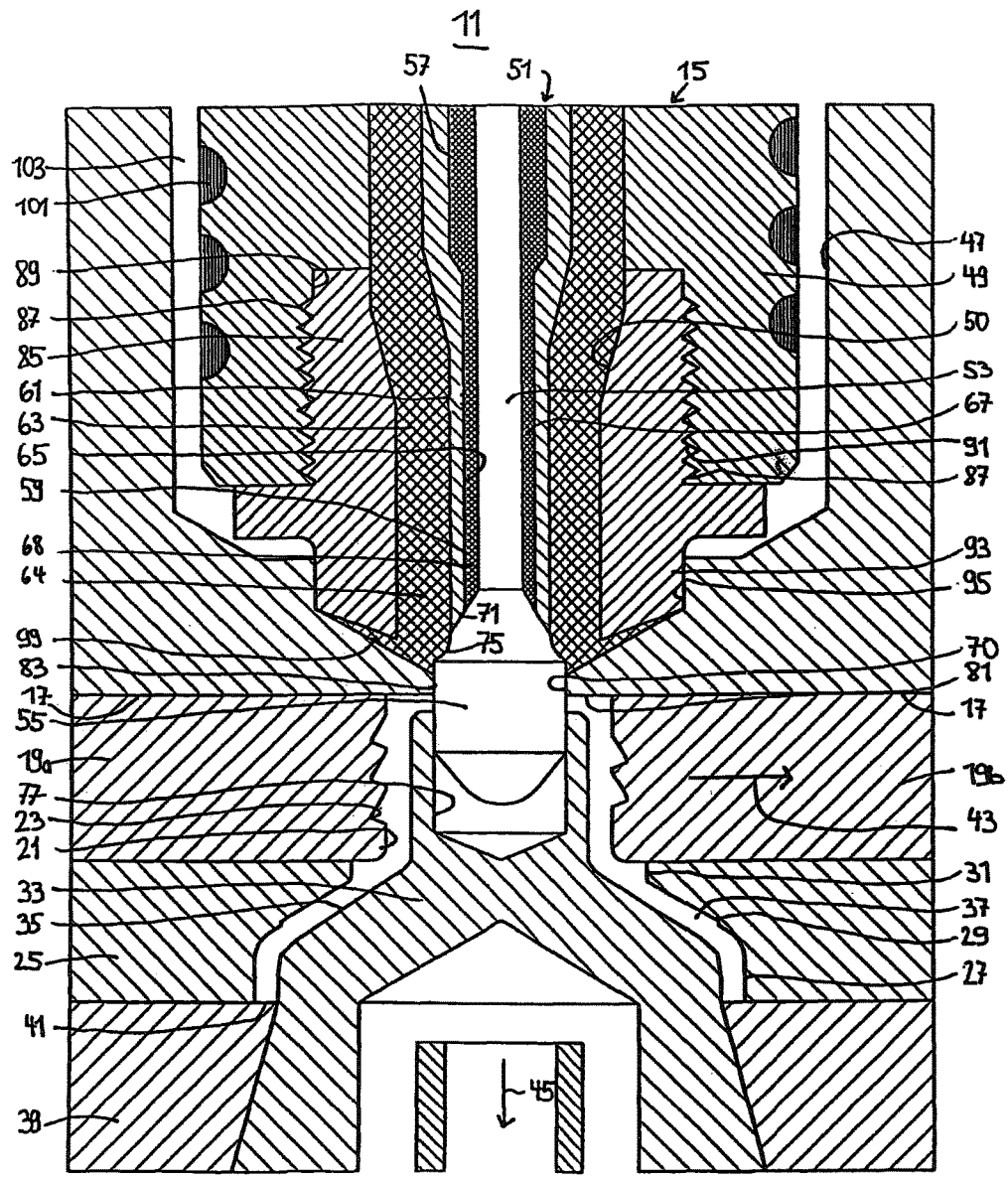
FIG. 1: is a schematic partial view of an injection molding device according to the invention for producing a tube head comprising a mold, which has a mold cavity, having a mold insert and a nozzle, wherein the first and second valves are disposed in the closed position.
Figure 2:
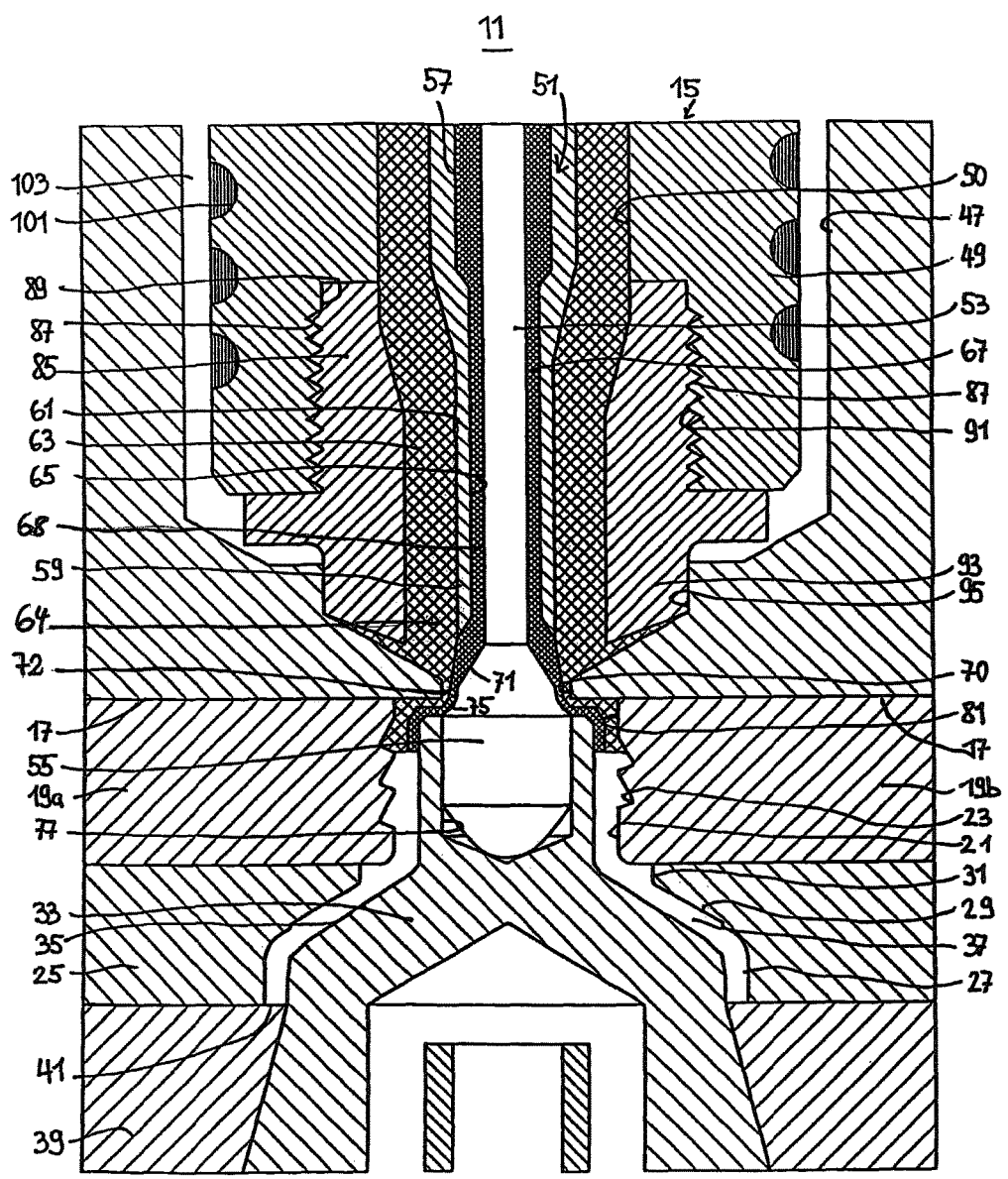
FIGS. 2 and 3: depict the injection molding device from FIG. 1 with the two valves in the open position, wherein two material components have already partially penetrated into the mold cavity (FIG. 2) or nearly fill it.
Figure 3:
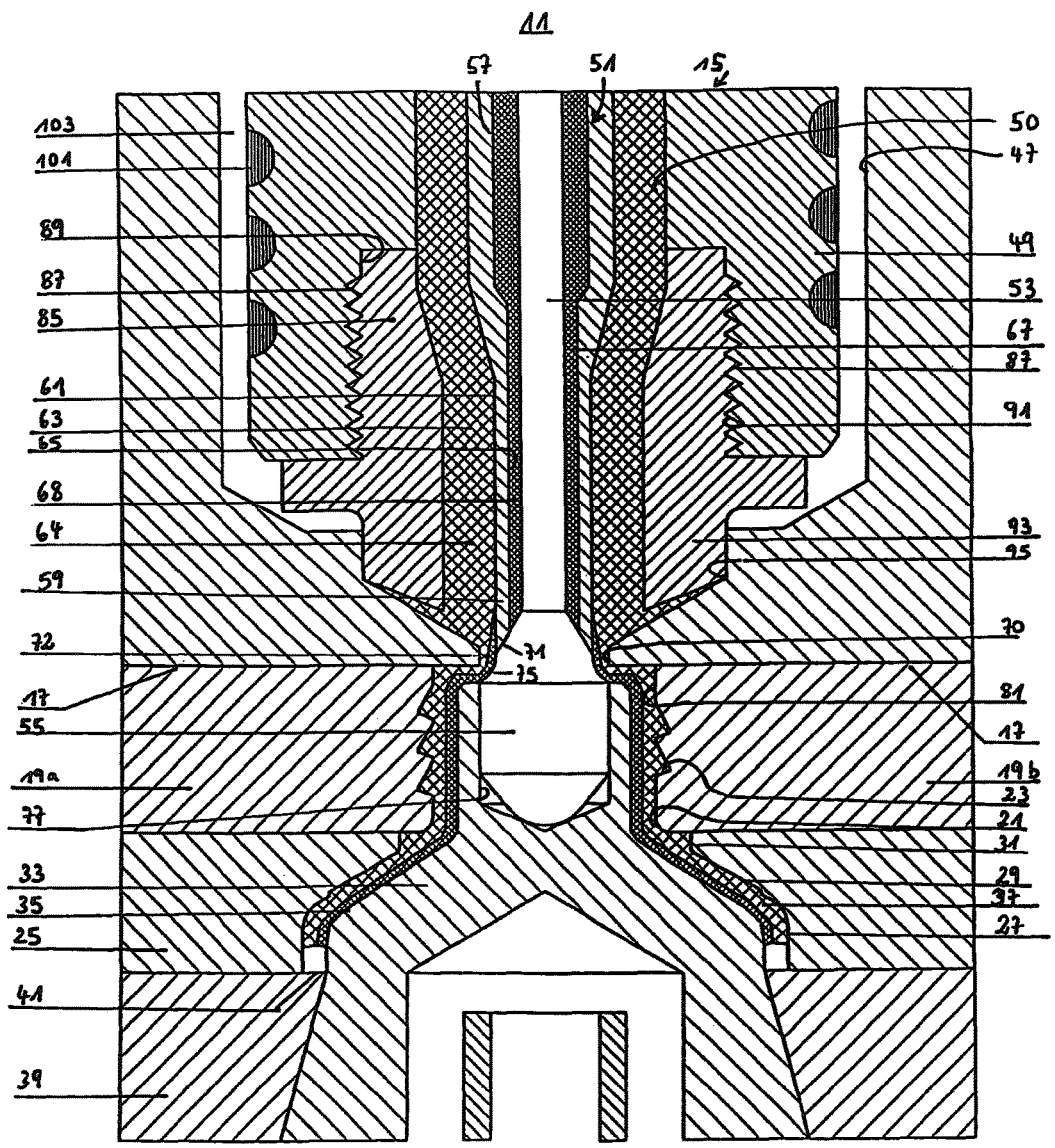
Figure 4:
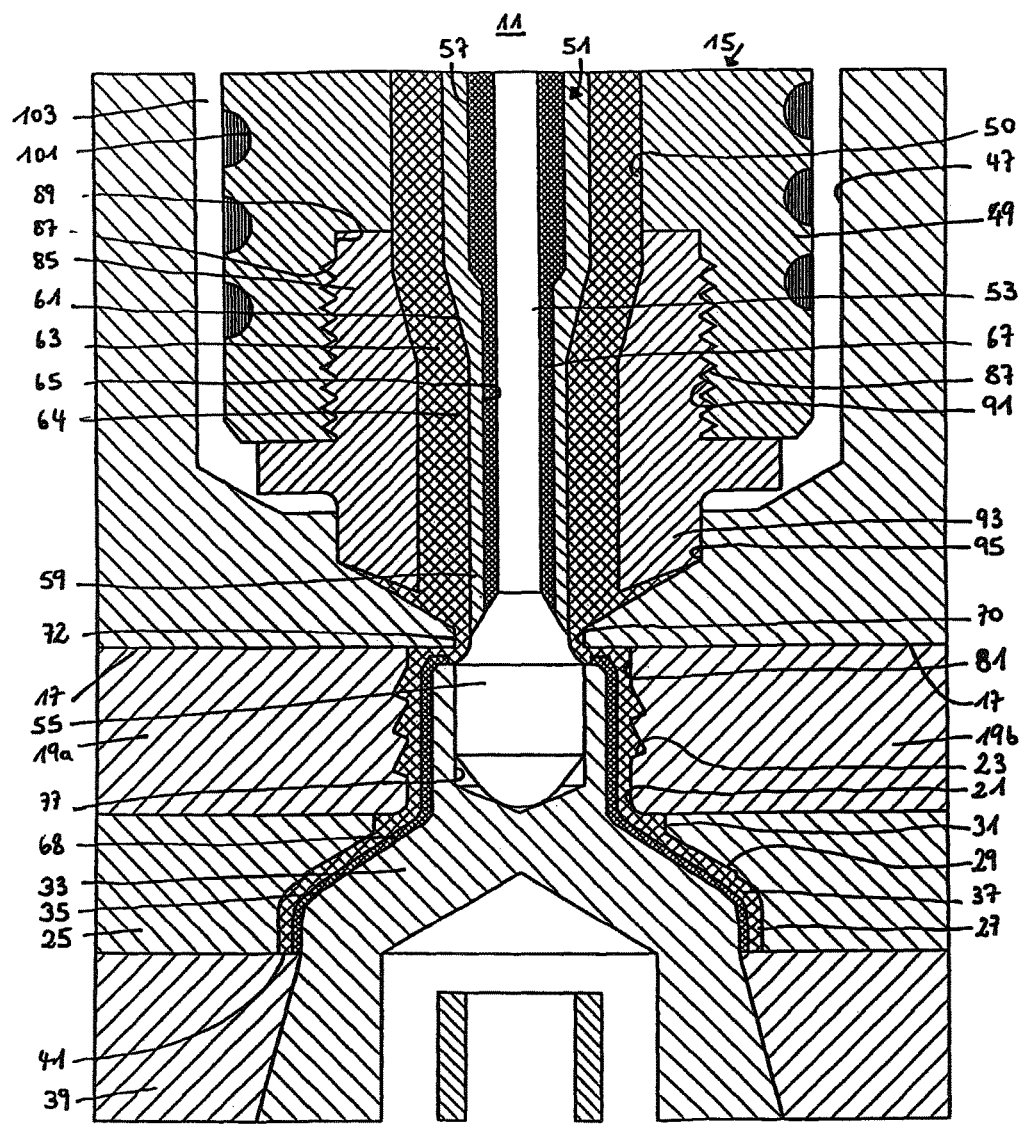
FIG. 4: depicts the injection molding device from FIG. 1 with the first valve in the open position and the second valve in the closed position.
Figure 5:
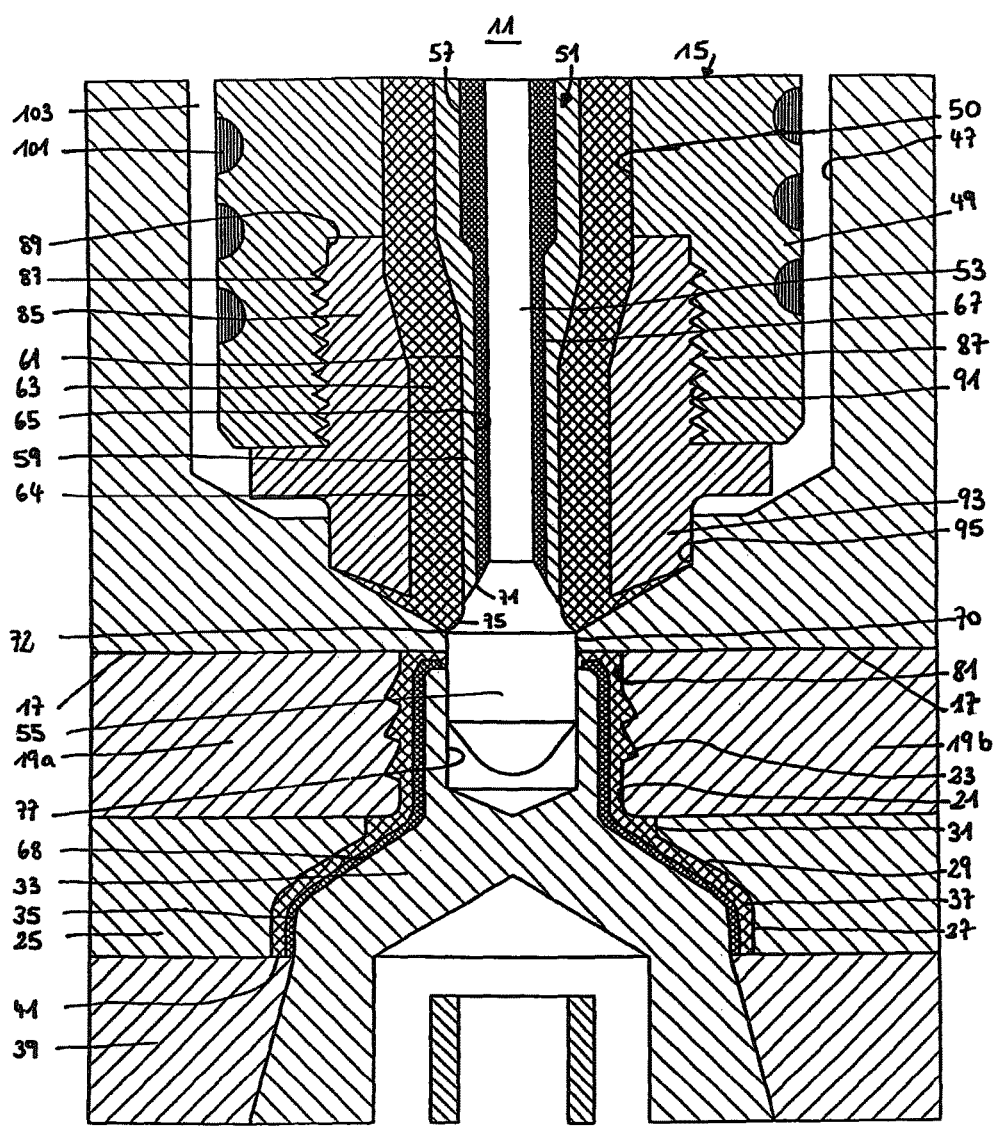
FIG. 5: depicts the injection molding device from FIG. 1 with the two valves in the closed position at the end of an injection molding cycle.
Figure 6:
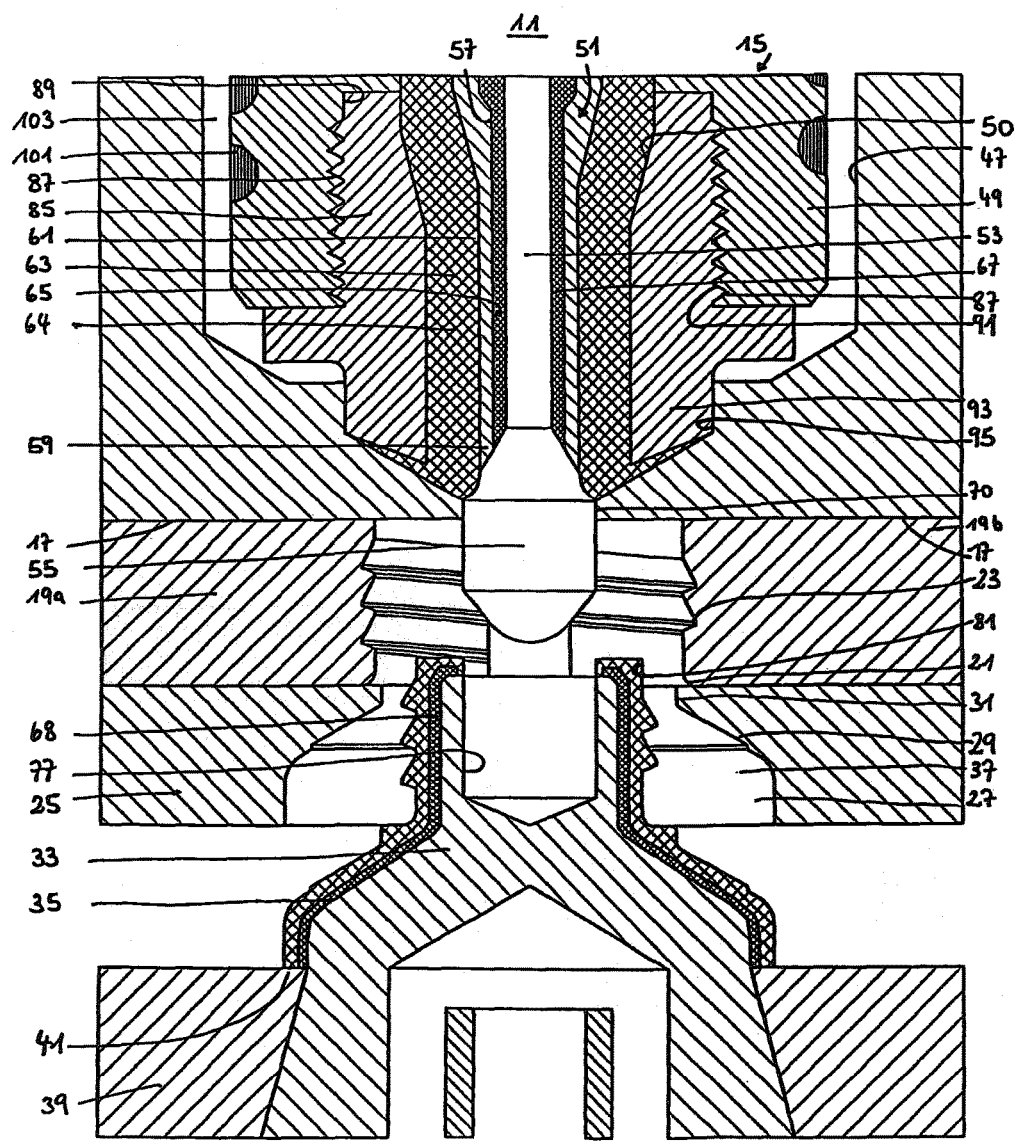
FIG. 6: depicts the injection molding device from FIG. 1 during a demolding process.

The injection molding device 11 depicted in FIGS. 1 through 4 for producing at least one tube head includes a mold having a mold insert 13 and includes a nozzle 15 that cooperates with the mold insert 13. The mold insert 13 and the nozzle 15 are received in a cavity of a mold block (not shown in greater detail in the figures). A plurality of such injection molding devices may be present adjacent to one another in the mold block in order to be able to produce a plurality of tube heads simultaneously in one work cycle. The injection molding devices are connected in a known manner to one or a plurality of extruders via distributor channels.

The mold insert 13 has a recess 17 in which two movable sliding parts 19a, 19b are received in a positive fit. The sliding parts 19a, 19b together form two mold halves, the inner contour 21 of which matches the outer contour of a tube neck to be produced. The inner contour 21 has grooves 23 that run in a helical line and that form the male thread of the tube neck.

The mold insert 13 has a rear mold section 25 that is immediately adjacent to the sliding parts 19a, 19b and that forms the negative of the outer contour of the tube shoulder to be produced. The mold section 25 has a first cylindrical section 27, a conical transition area 29, and a second cylindrical section 31 that is connected to the movable sliding parts 19a, 19b. The second cylindrical section 31 is used for producing a tube collar that is disposed between tube neck and tube shoulder. The molding of a tube collar is not absolutely necessary, but is recommended from a production perspective because otherwise an interfering annular bulge or at least a visible edge should be left over due to the mold insert having multiple parts.

An axially movable core 33 is received in the mold section 25. The core 33 has an outer contour 35 that matches the inner contour of the tube head to be produced. A mold cavity 37 is present between the mold insert 13 and the core 33 and is completely filled with a flowable plastic material during the injection molding process.

A so-called stripper 39 is provided connected to the mold section 25. With the annular section 41, the stripper 39 forms the end face rear wall of the tube head. For demolding a tube head, first the sliding parts 19a, 19b are moved away from one another (arrow 43) and then the core is retracted with the stripper 39 in the axial direction (arrow 45). The finished tube head is pulled off of the location-fast core 33 using the movable stripper 39 and drops down if the mold insert is installed horizontally.

The nozzle 15 is arranged in a recess 47 of the mold insert 13. It includes a nozzle body 49 having an axial passage 50 in which a valve needle 51 is arranged and may be moved axially. The valve needle 51 has a valve needle shaft 53 having a terminal valve needle head 55. The valve needle shaft 53 is enclosed by an axially movable valve sleeve 57 that has an inner diameter that is larger than the outer diameter of the valve needle shaft 53 and the anterior end 59 of which may be positioned against the valve needle head 55 in sealing manner. Using the nozzle structure according to the invention, a first flow channel 63 for a first material component 64 is created between the outer surface 61 of the valve sleeve 57 and the axial passage 50, and a second flow channel 67 for a second material component 68 is created between the inner wall 65 of the valve sleeve 57 and the valve needle shaft 53.

The valve needle head 55 has a cylindrical body 69 that in cooperation with a cylindrical section 70 of the mold insert forms a first valve for the first material component 64. When the first valve is open, an annular opening 72 is formed (see e.g. FIG. 2) through which the melt may exit radially outward at an angle. The angle may be between 30 and 90 degrees relative to the longitudinal axis of the device. A conical transition area 71 is provided between the cylindrical body 69 and the valve needle shaft 53. The anterior end 59 of the valve sleeve 57 is embodied such that the surface of the distal end face 73 may be positioned against the cone 71 and thus a second valve is formed for the second material component 68. For optimizing the flow of melt, the transition area 71 may have a circumferential depression 75 so that the plastic melt meets little resistance when injected into the mold cavity.

When the first valve is in the open position, the valve needle head 55 is received in a cylindrical recess 77 that is provided in the nozzle-side end face of the core 33. The outer diameter of the cylindrical body 69 is substantially the same as the inner diameter of the recess 77 so that there is only slight clearance of less than 20 micrometers, or less than 10 micrometers. This ensures good lateral guidance of the valve needle, even when the first valve is in the open position. The surface of the cylindrical part of the valve needle head 55 may also be provided with annular punctures in order to reduce the heat transmission from the valve needle head 55 to the recess 77 of the cooled core 33 (not shown in the figures). The valve needle head 55 may also be produced from a material that conducts heat poorly in order to reduce the undesired heating of the core 33.

An annular gap 83 that acts as gate opening is formed between the distal annular edge 79 of the core 33 and a surface 81 of the mold insert 13 opposing the latter. If the valve needle is moved from a pushed-back closed position (FIG. 1) to an advanced open position (FIGS. 2 through 5), a fluid connection is created with at least the first flow channel 63 and the first material component may flow into the mold cavity 37.

It may be seen from the figures that the inner wall of the recess 77 and the cylindrical section 70 must be flush with one another so that the valve needle may be advanced and retracted unimpeded between the closed position and the open position.

A substantially cylindrical sealing element 85 having a male thread 87 is provided for sealing the nozzle head 49 in the recess 47. It is screwed into a corresponding bore 89 having a female thread 91. The sealing element has a cylindrical section 93 that is received in a positive fit in a corresponding cylindrical section 95 of the mold insert 13. In order to permit thermal expansion of the nozzle body, a small opening gap 99 of a few hundredths of a millimeter, or <10 hundredths of a millimeter (depicted out of proportion in the figures) may be provided between the anterior end face 97 of the sealing element 85 and the mold insert 13.

A heating device 101 is inserted in the outer surface of the nozzle body. In addition, an air gap 103 is provided between the nozzle 15 and the mold insert 13 for purposes of thermal insulation.

The injection molding device according to the invention may be used as follows: For producing a two-layer tube front part, the valve needle 51 is moved into the open position and at the same time the valve sleeve 57 is retracted relative to the valve needle so that both the first valve and the second valve are opened essentially simultaneously. Because of this a first structure material 64 may flow through the first flow channel and a barrier material 68 may flow through the second flow channel through the annular opening and the annular gap into the mold cavity 37. Shortly before the mold cavity is filled with the material components, the barrier material 68 is stopped so that it is delimited at the end face by the structure material 64. In this way it is possible to prevent delamination. That is, it is significant that the two material components are injected simultaneously during nearly the entire cycle period, or at least during 90% of the time period—this is in contrast to the previously cited prior art.

Figure 7:
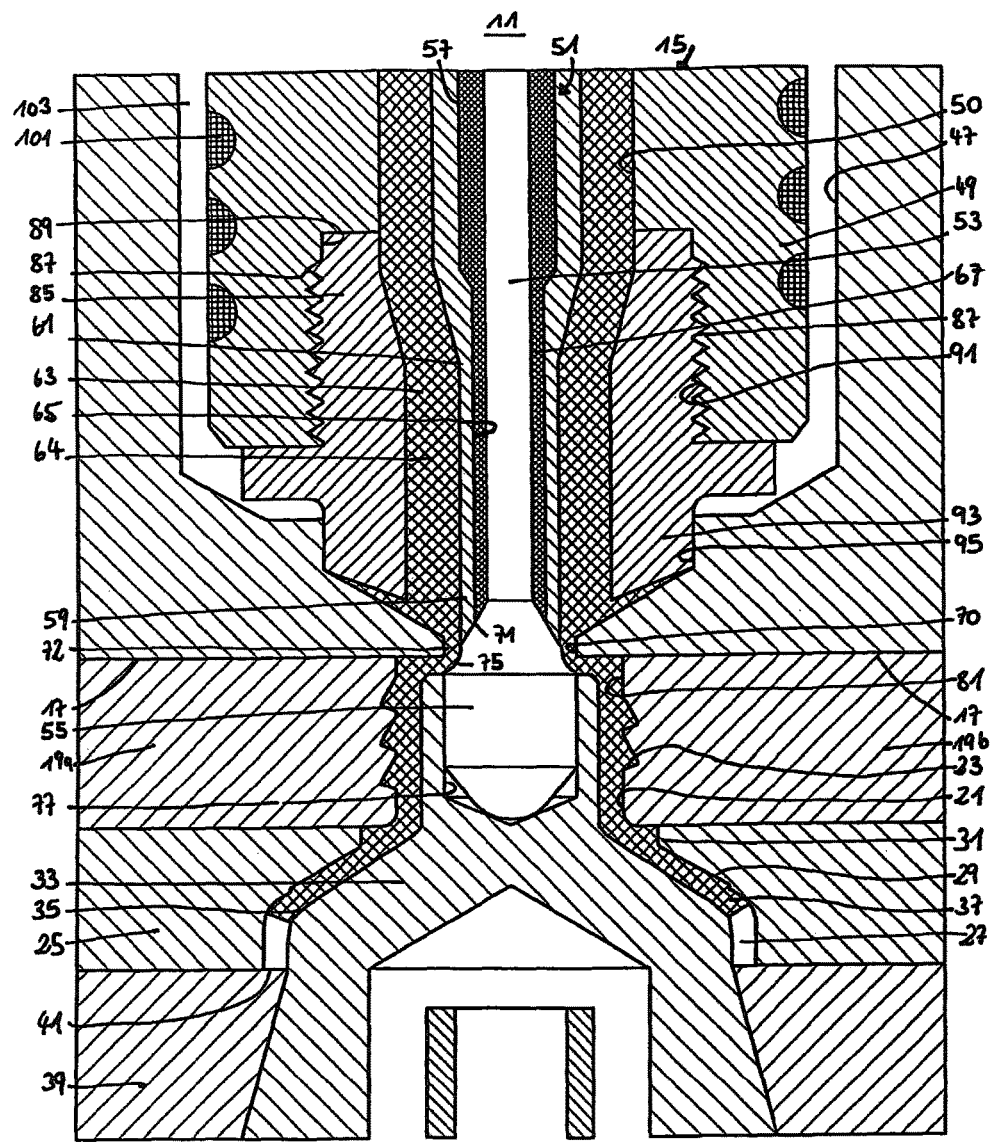
FIGS. 7 through 9: depict various stages during the production of a S-layer tube head.
Figure 8:
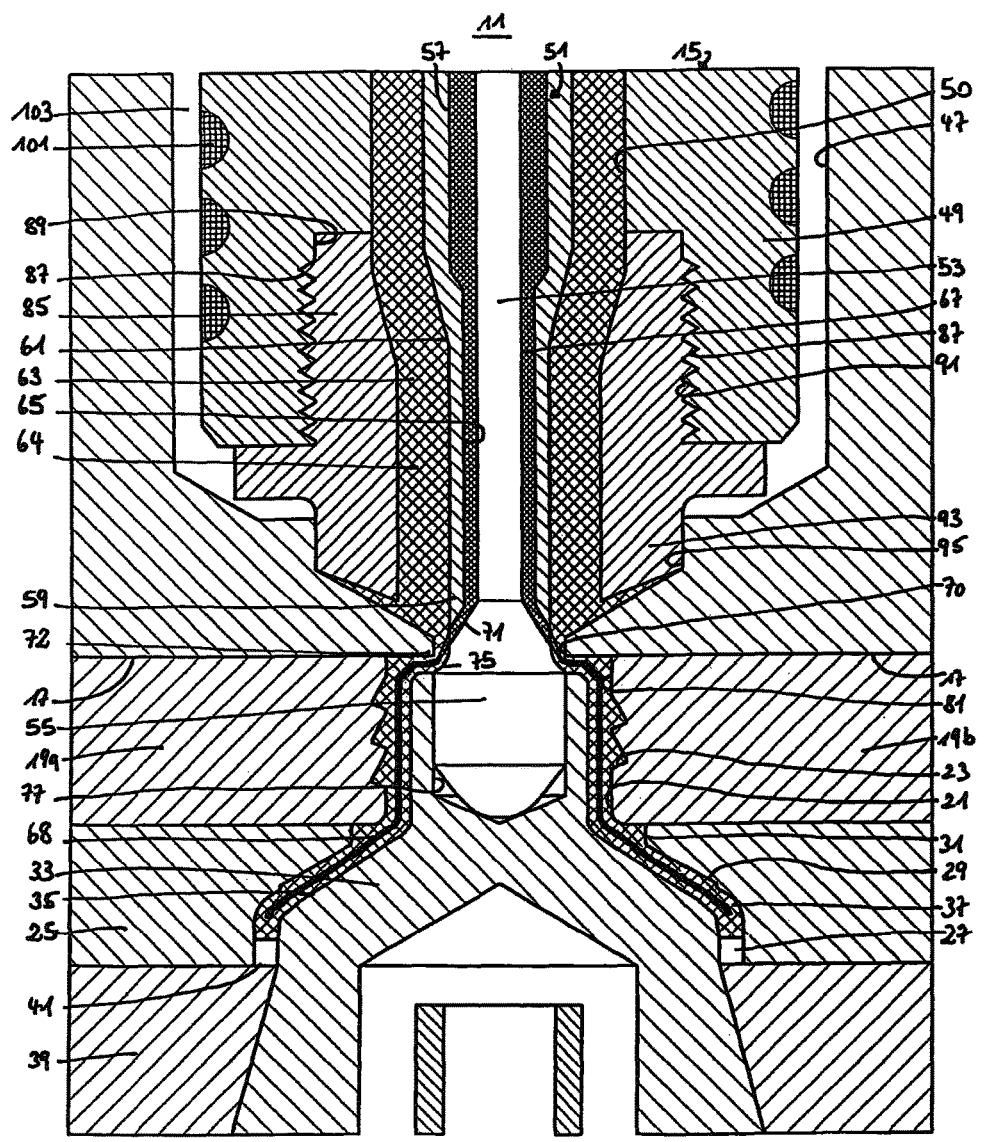
Figure 9:
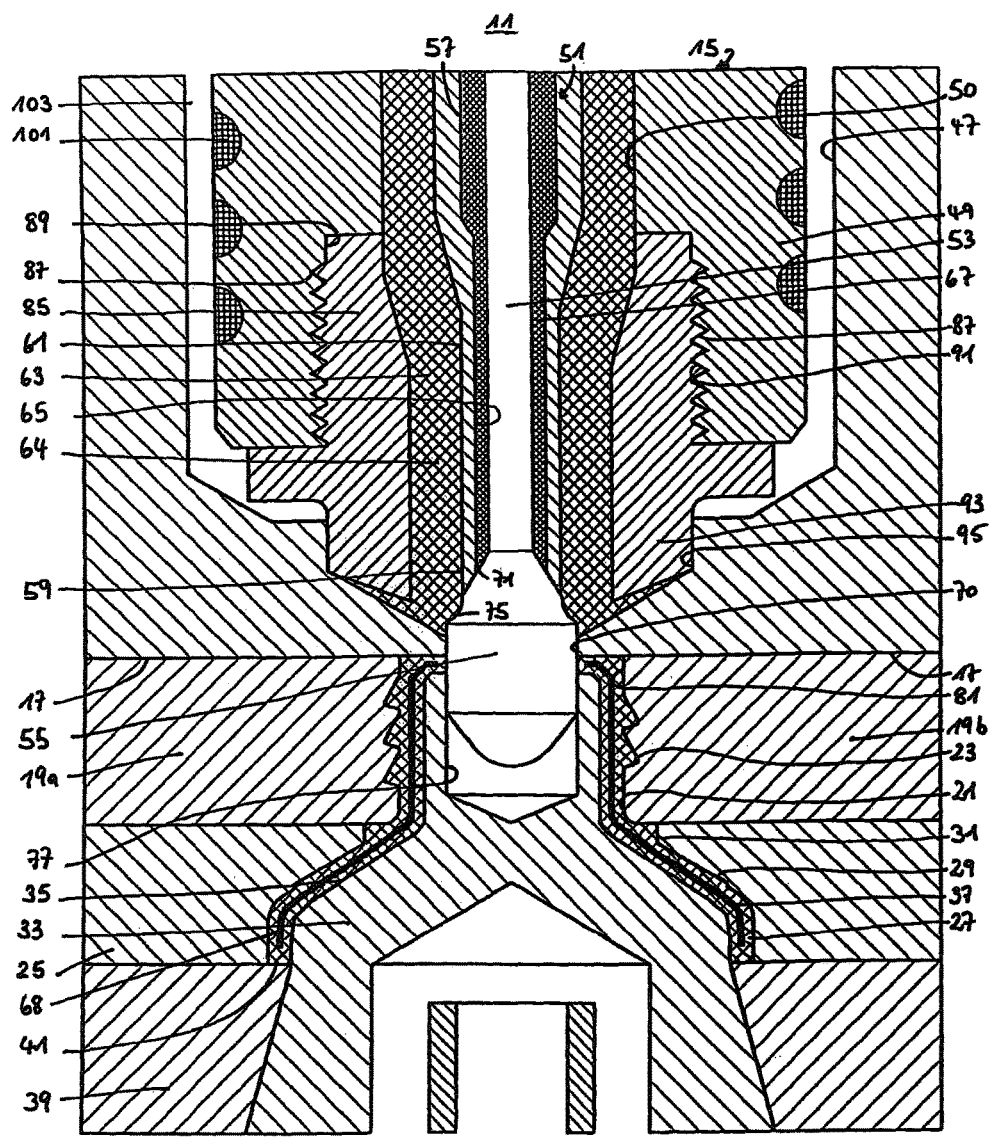

For producing a three-layer tube head (FIGS. 7 through 9), first the structure material 64 is injected into the mold cavity, specifically until it has filled up to approx. 70-85 percent by volume (FIG. 7). Then the structure material is stopped and the barrier material 68 is injected into the core of the structure material 64 (FIG. 8). Since at this point in time, when the barrier material has begun to be injected, there is already some consolidation on the outer surfaces, the barrier material may penetrate far in the core of the structure material towards the end face 41. At the conclusion the barrier material 68 is stopped and another small quantity of the structure material 64 is injected so that the latter may completely enclose the barrier material (FIG. 9).

An injection molding device for producing at least one tube head having a tube shoulder and a neck formed thereon having a press-out opening includes a mold defining a mold cavity 37 and a nozzle 15 that cooperates with the mold. The nozzle 15 has a nozzle body 49 and a valve needle 51 that is movable in the nozzle body 49 in the direction of the tube longitudinal axis. The valve needle 51 comprises a valve needle shaft (53) and a terminal valve needle head 55.

The valve needle 51 is enclosed by a first flow channel 63 through which a first material component 64 may be pressed. The opening 72 of the nozzle 15 is closed by the valve needle head 55 when the valve needle 55 is in a retracted position and released by the valve needle head 55 when the valve needle 51 is in an advanced position, wherein when the valve needle 51 is in the advanced position an annular outlet opening 72 is formed that, with an annular gap 83 of the mold acting as a gate opening of the mold, produces a fluid connection in the mold cavity 37.

The invention claimed is:

1. An injection molding device for producing at least one tube head with a tube shoulder and neck formed thereon with an extrusion opening, comprising:
    a mold defining a mold hollow space and having a mold insert that substantially defines an outer shape of a tube head and having a core that forms an inner shape of the tube head; and
    a nozzle cooperating with an inlet of the mold, the nozzle comprising:
        a nozzle body defining a nozzle opening; and
        a valve needle moveable in a first direction relative to the nozzle body and corresponding to the longitudinal axis of a tube body to be produced, the valve needle comprising a valve needle shaft and a valve needle head, the nozzle opening comprising at least one first annular space surrounding the valve needle to provide a first flow channel for a first material component, wherein when the valve needle is in a retracted position the nozzle opening is closed by the valve needle head to prevent a flow of the first material component through the inlet of the mold, and when the valve needle is in a forwardly displaced position the nozzle opening is opened by the valve needle head to form an annular outlet opening, which matches an annular gap defined by the mold, through which the first material component can flow, to provide a gate opening with a cylindrical section of the mold insert in co-operation with the valve needle head forming a first valve.

2. The device of claim 1, wherein the annular gap is oriented radially inwardly.

3. The device of claim 1, wherein the core is moveable in the direction of a longitudinal axis of the tube body.

4. The device of claim 1, wherein the core defines a recess on the front side in the shape of a hollow cylinder to accommodate the valve needle head.

5. The device of claim 1, wherein the mold insert is formed from a plurality of parts and in the neck region comprises two moveable slide parts that are moveable in opposite directions between an open position and a closed position.

6. The device of claim 1, wherein the annular gap is located between the core and the mold insert.

7. The device of claim 1, wherein the valve needle head has a cylindrical body and a conical tip.

8. The device of claim 1, further comprising a moveable valve sleeve surrounding the valve needle shaft, wherein between the valve needle shaft and the valve sleeve a second annular space is formed, which serves as second flow channel for a second material component.

9. The device of claim 8, wherein the valve needle and the valve sleeve are axially moveable independently of one another.

10. The device of claim 9, wherein between the valve needle shaft and the valve needle head a conical transition region is formed and a front side of the valve sleeve can cooperate with the conical transition region to form a second valve.

11. The device of claim 10, wherein the conical transition region adjoining the cylindrical body of the vale needle head defines a surrounding depression.

12. An injection molding device for producing at least one tube head with a tube shoulder and neck formed thereon with an extrusion opening, comprising:
    a mold defining a mold hollow space and having a mold insert that substantially defines an outer shape of a tube head and having a core that forms an inner shape of the tube head; and
    a nozzle cooperating with the mold, the nozzle comprising:
        a nozzle body defining a nozzle opening; and
        a valve needle moveable in a first direction relative to the nozzle body and corresponding to the longitudinal axis of a tube body to be produced, the valve needle comprising a valve needle shaft and a valve needle head, the nozzle opening comprising at least one first annular space surrounding the valve needle to provide a first flow channel for a first material component, wherein when the valve needle is in a retracted position the nozzle opening is closed by the valve needle head to prevent a flow of the first material component through the inlet of the mold, and when the valve needle is in a forwardly displaced position the nozzle opening is opened by the valve needle head to form an annular outlet opening, which matches an annular gap defined by the mold, through which the first material component can flow, to provide a gate opening with a cylindrical section of the mold insert in co-operation with the valve needle head forming a first valve;

the core having a recess on a front side in the form of a hollow cylinder closed on one side for receiving the valve needle head and for providing lateral guidance in the forwardly displaced position of the valve needle, in the retracted position of the valve needle or in any other position of the valve needle between the forwardly displaced position and the retracted position.

13. The device of claim 12, wherein the annular gap is oriented radially inwardly.

14. The device of claim 12, wherein the core is moveable in the direction of a longitudinal axis of the tube body.

15. The device of claim 12, wherein the mold insert is formed from a plurality of parts and in the neck region comprises two moveable slide parts that are moveable in opposite directions between an open position and a closed position.

16. The device of claim 12, wherein the annular gap is located between the core and the mold insert.

17. The device of claim 12, wherein the valve needle head has a cylindrical body and a conical tip.

18. The device of claim 12, further comprising a moveable valve sleeve surrounding the valve needle shaft, wherein between the valve needle shaft and the valve sleeve a second annular space is formed, which serves as second flow channel for a second material component.

19. The device of claim 18, wherein the valve needle and the valve sleeve are axially moveable independently of one another.

20. The device of claim 19, wherein between the valve needle shaft and the valve needle head a conical transition region is formed and a front side of the valve sleeve can cooperate with the conical transition region to form a second valve.

21. The device of claim 20, wherein the conical transition region adjoining the cylindrical body of the vale needle head defines a surrounding depression.

* * * * *